United States Patent [19]

Waring

[11] Patent Number: 4,784,030
[45] Date of Patent: Nov. 15, 1988

[54] SLITTER APPARATUS

[75] Inventor: Norman W. Waring, Kitchener, Canada

[73] Assignee: The Uniroyal Goodrich Tire Company, Akron, Ohio

[21] Appl. No.: 12,916

[22] Filed: Jan. 27, 1987

Related U.S. Application Data

[63] Continuation of Ser. No. 674,438, Nov. 23, 1984, abandoned.

[51] Int. Cl.[4] .............................................. B26D 1/24
[52] U.S. Cl. ...................................... 83/105; 83/471; 83/491; 83/501; 83/675
[58] Field of Search .................................. 83/500–503, 83/675, 676, 491, 492, 923, 105, 471

[56] References Cited

U.S. PATENT DOCUMENTS

| Re. 29,268 | 6/1977 | Kuts | 83/676 X |
|---|---|---|---|
| 479,037 | 7/1892 | Trethewey | 83/503 |
| 1,181,354 | 5/1916 | Stevens | 83/492 |
| 1,796,463 | 3/1931 | Kaltenbach et al. | 83/676 X |
| 2,085,835 | 7/1937 | Strecker et al. | 83/500 X |
| 2,554,114 | 5/1951 | Menkin et al. | 83/114 |
| 2,786,527 | 3/1957 | Bruns | 83/923 X |
| 3,246,553 | 4/1966 | O'Brien | 83/923 X |
| 3,459,086 | 8/1969 | Reeder, Jr. | 83/502 X |
| 3,813,981 | 6/1974 | Faltin | 83/500 |
| 3,854,361 | 12/1974 | Kercher et al. | 83/501 X |
| 3,858,474 | 1/1975 | Kuts | 83/675 X |
| 4,276,796 | 7/1981 | Weresch | 83/500 X |
| 4,382,397 | 5/1983 | DeTorre | 83/675 X |
| 4,520,704 | 6/1985 | Olshansky et al. | 83/500 X |

Primary Examiner—Frank T. Yost
Attorney, Agent, or Firm—Michael J. Colitz, Jr.; Alan A. Csontos

[57] ABSTRACT

Disclosed is an apparatus to longitudinally cut a cord reinforced rubber sheet into at least two strips of tire ply stock while the sheet is being conveyed past the apparatus. The apparatus includes a slitting device that utilizes shear-type action to cut through the sheet by the interaction of rotating disc-like upper and lower slitters. The upper slitter is power driven while the lower slitter is rotated by frictional contact between the upper and lower slitter. The apparatus may include a trimming device for trimming a boundary strip of the sheet. The trimming device also utilizes shear-type action to trim the sheet by rotating disc-like upper and lower trimmers similar to the upper and lower disc-like slitters of the slitting device.

1 Claim, 5 Drawing Sheets

SLITTER APPARATUS

This is a continuation of application Ser. No. 674,438, filed Nov. 23, 1984, now abandoned.

BACKGROUND OF THE INVENTION

This invention relates to an apparatus for cutting cord reinforced rubber sheet and more particularly an apparatus for longitudinally cutting such cord reinforced rubber sheet into strips of ply stock of the type employed in the construction of pneumatic tires.

In pneumatic tires, certain of the principal components thereof are sheets or plies of cord-reinforced rubber which form the carcass and belts of the tires. In the manufacture of such plies, parallel reinforcing cords of fabric, glass, or metal are pressed through a pair of rolls in cooperation with calendering rolls which work unvulcanized rubber onto the parallel cords as they pass through the rolls to form a continuous rubber sheet with reinforcing cords embedded therein. Thereafter, the sheet is cut diagonally or "bias" cut into strips so that the parallel cords are disposed at a desired "bias" angle to the cut edges. This bias cutting operation, as well as a bias cutter therefor, are described, for example, in U.S. Pat. No. 4,069,729.

The bias cut strips are then spliced end to end to form the reinforced rubber sheet with the cords therein located at a desired "bias" angle relative to the longitudinal center line of the sheet. The strips which form this sheet are sometimes bias cut to a width which is greater than a particular tire ply specification width so that the sheet formed from the strips can supply more than a single width of tire ply stock. For example, the sheet of spliced bias cut strips from which belt ply stock of a particular width is taken may be formed to twice that particular width. In this instance, the bias sheet formed from strips from the bias cutter must then be longitudinally cut into predetermined widths of ply stock before being usable in the construction of a tire.

An apparatus cut to a multiwidth sheet normally includes a slitting device comprising a lower stationary anvil-type blade member and an upper rotating disc-like slitter cooperating in shear with the anvil-type blade. The anvil-type blade member usually has a linear or straight cutting edge.

An anvil-type blade cooperates with a rotating disc-like slitter to shear the sheet that is fed to and from such slitting device. The rotation of the peripheral cutting edge or edges on the rotating slitter induces a downward shearing action to interact with the linear cutting edge of the anvil-type blade member.

The sheet which is longitudinally cut to form the strips sometimes can have an irregular edge. In these instances, the longitudinal slitting device may be augmented by a trimmer to maintain the sheet at a uniform width by trimming the irregular edge of the sheet.

A trimming device is usually located beside the slitting device and usually comprises a lower stationary anvil-type blade member and an upper rotating disc-like trimmer similar to the slitting device.

The interaction of the rotating disc-like slitter or trimmer with a stationary anvil-type blade wears the linear cutting edge of the anvil-type blade rapidly. This requires frequent blade changes resulting in downtime of the apparatus, necessary maintenance to replace or sharpen the worn blades and misalignment between the blade and the rotating slitter or trimmer.

Use of a linear edge anvil blade which reciprocates, such as described in U.S. Pat. No. 3,858,474 can prolong somewhat the periods of use of the anvil blade before sharpening or replacement is necessary. However, the changing of the blade can still result in misalignment of the reciprocating anvil cutter and the rotating slitter.

Another way to prolong lower anvil life which has been suggested is to replace the linear anvil cutter with an indexing or slowly turning disc-like blade with a plurality of linear edges along its peripery. This disc-like lower blade requires an additional means to turn the cutter at the desired slow speed and can result in slitting operations which are not as precise or "clean" as when lower stationary anvil-type blades are used.

SUMMARY OF THE INVENTION

It is an object of the present invention to provide an improved apparatus for longitudinally cutting cord reinforced rubber sheet into at least two strips of tire ply stock.

The principal component of the apparatus of the present invention is a slitting device which comprises a rotatable upper disc-like slitter and a rotatable lower disc-like slitter. The upper slitter has a cutting means along its periphery and the lower slitter has a cutting means along its periphery. The rotating upper slitter contacts the lower slitter effecting the rotation of the lower slitter through friction such that the upper and lower slitter rotate essentially at the same speed. The cutting means of said upper slitter cooperates in shear with the cutting means of said lower slitter. Preferably the cutting means along the periphery of the upper slitter is a plurality of linear cutting edges and the cutting means along the periphery of the lower slitter is a curvilinear or circular edge.

The apparatus of the present invention may further include a trimming device located adjacent to the slitting device which comprises a rotatable upper disc-like trimmer and a rotatable lower disc-like trimmer similar in construction to the upper and lower slitters of the slitting device. The rotating upper trimmer contacts the rotatable lower trimmer effecting the rotation of the lower trimmer through friction such that the upper and lower trimmer rotate essentially at the same speed. The cutting means of said upper trimmer cooperates in shear with the cutting means of said lower trimmer.

The apparatus of the present invention for longitudinally cutting bias sheet into widths of ply stock can be used for significantly longer periods before sharpening and/or replacement of blades or cutters is necessary, resulting in less down time, less maintenance and misalignment problems and substantial factory operating cost savings.

DETAILED DESCRIPTION

Figure 1:
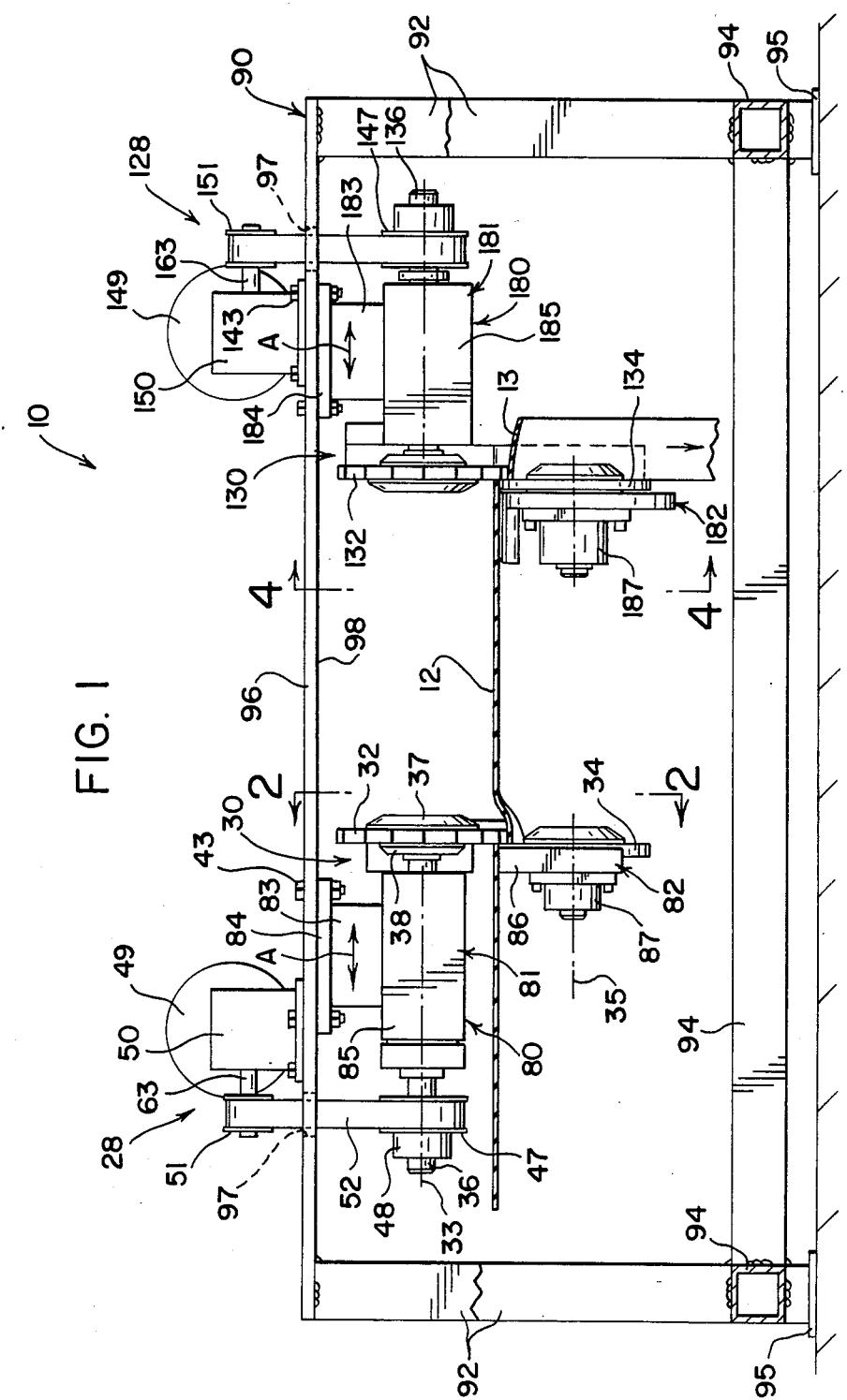
FIG. 1 is a longitudinal sectional view of a preferred embodiment of an apparatus according to the invention with parts shown in section, broken away or omitted.

In FIG. 1 an apparatus 10 to longitudinally cut a cord reinforced rubber sheet 12 according to the invention is shown in a presently preferred embodiment. The apparatus 10 comprises a slitting device 30 and a trimming device 130. The trimming device 130 is used to maintain the sheet 12 at a uniform width, if required, by trimming a boundary strip 13 of the sheet 12. The trimming device 130 may be omitted if sheet width uniformity is assured by other means or if such a uniformity is not of concern. A pair of conveyors as disclosed in U.S. Pat. No. 3,858,474, may be used to feed said sheet material to and take strips from the apparatus 10.

The slitting device 30 and trimming device 130 are supported on a frame 90 which includes an upper horizontal supporting table 96 and four vertical support members or legs 92 each having a foot 95 to support the frame 90. The bottom face 98 of the table 96 is welded or otherwise secured to the top of each leg 92. Welded or otherwise secured to the lower portions of legs 92 are four lower horizontal support beams 94. Each device 30 and 130 may be secured to the bottom face 98 of the table 96 in such a fashion as to allow axial adjustment of the devices as indicated by arrows A for longitudinally cutting various sizes of sheet 12 into various sizes of ply stock. Holes 97 exist in the table to allow motors 49 and 149 to power respectively the slitting device 30 and trimming device 130.

Figure 2:
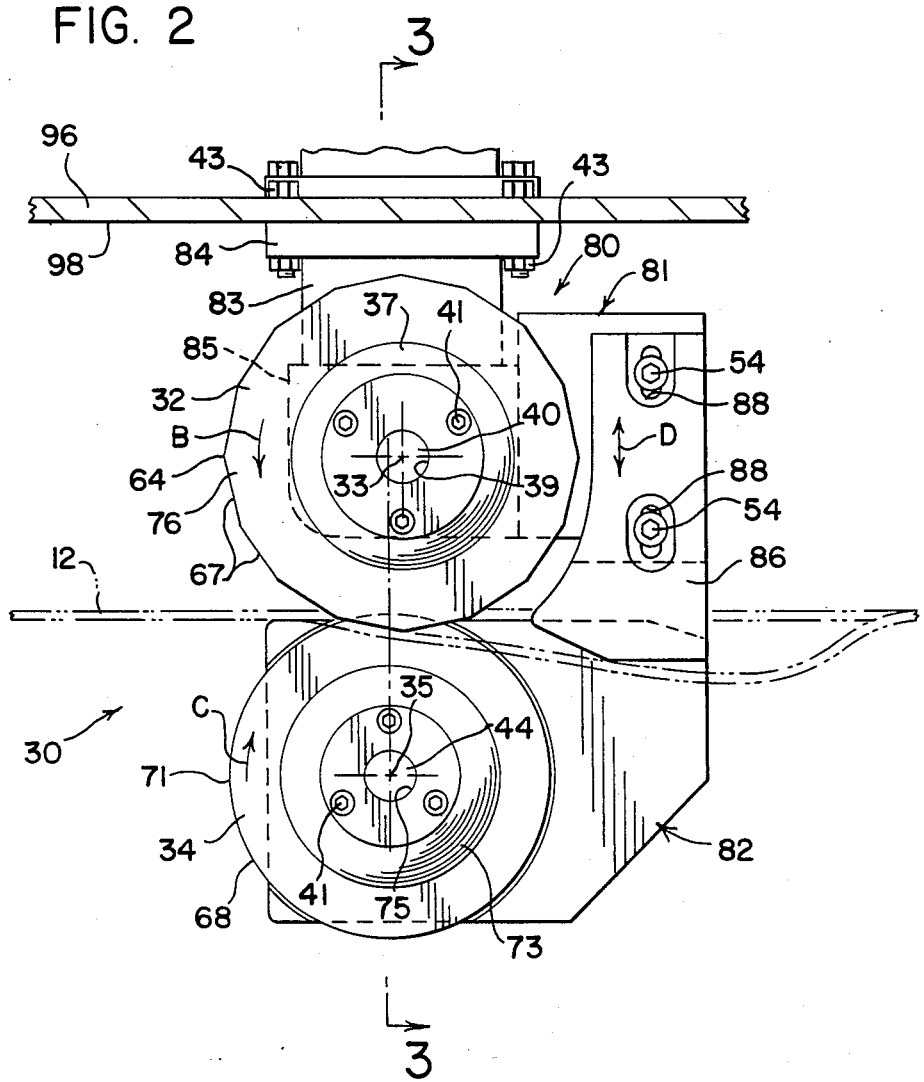
FIG. 2 is an end view taken along the line 2—2 in FIG. 1.
Figure 3:
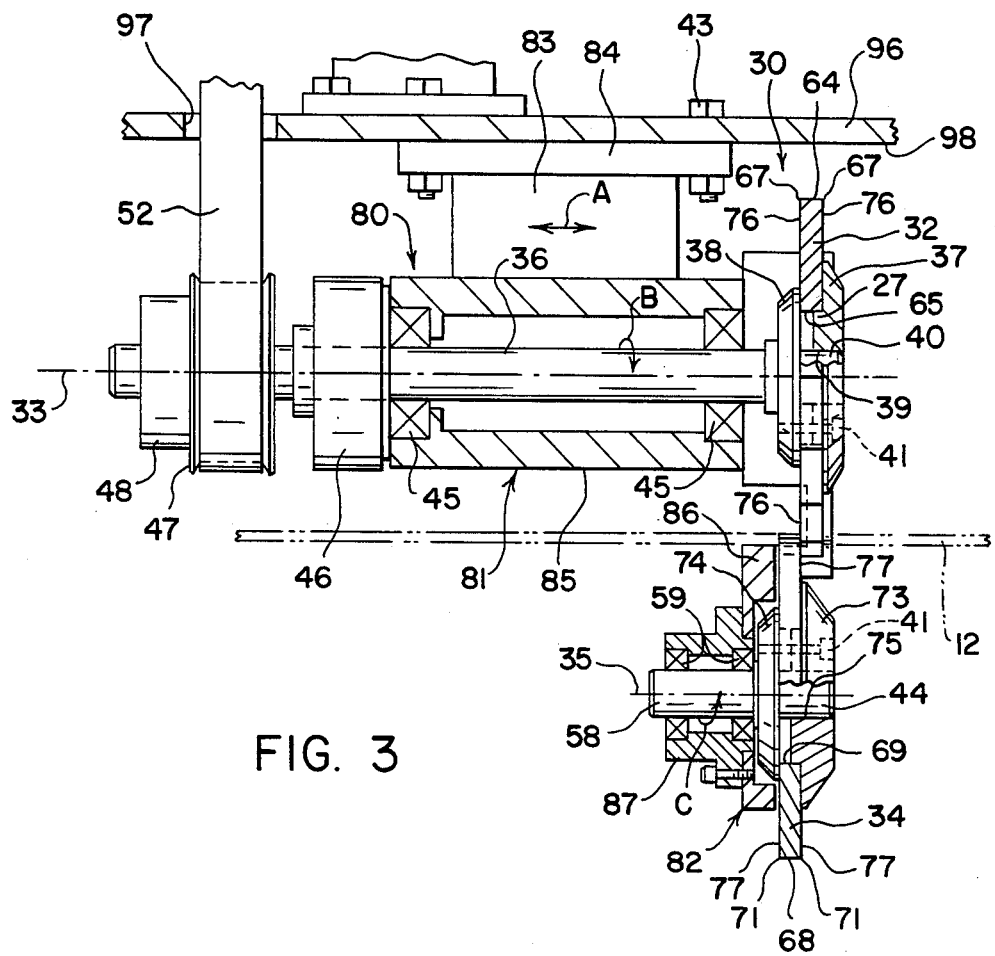
FIG. 3 is an enlarged longitudinal sectional view taken along line 3—3 in FIG. 2.

The slitting device 30, as seen in FIGS. 1, 2 and 3, comprises an upper slitter drive 28, an upper disc-like slitter 32 and a lower disc-like slitter 34 rotatably mounted in and supported by a slitter support generally referenced 80. The upper slitter 32 is mounted for rotation about horizontal axis 33 and the lower slitter 34 is mounted for rotation about another horizontal axis 35.

Slitter support 80 includes an upper section 81 and a lower section 82. Upper section 81 includes an upper shaft journal box or housing 85 and a support arm 83 with a mounting flange 84. Mounting flange 84 of support arm 83 is attached to the bottom face 98 of the table 96 by bolts 43 or may be otherwise secured to the table 96 by conventional means. The flange 84 may be secured in a manner (not shown) to allow for axial adjustment of support arm 83 for reasons previously mentioned. Lower section 82 of slitter support 80 includes a lower shaft journal box or housing 87 and an extension plate 86. Lower section 82 is secured to upper section 81 by bolts 54 registered through oversized openings 88 in extension plate 86. The oversized openings 88 allow for vertical adjustment of lower section 82 relative to upper section 81 as indicated by arrow D.

Upper section journal housing 85 and lower section journal housing 87 are provided with bearings 45 and 59, respectively (see FIG. 3), to support rotating shafts within such housings. An upper slitter shaft 36 is mounted for rotation within journal housing 85 while a lower slitter shaft 58 is mounted for rotation within journal housing 87.

Suitably secured at one end 40 of the upper slitter shaft 36 is the upper disc-like slitter 32 of slitting device 30, which has an outer periphery 64, a pair of flat surfaces 76, and a central bore 65, as shown in FIG. 3. Each margin of the periphery 64 comprises a series of sixteen linear cutting edges 67 of equal length defining a polygonal cutting edge. Wear resistance of the cutting edges 67 may be improved if each cutting edge 67 is composed of a hard material such as carbide. The slitter 32 is secured to the shaft 36, positioned between a flange 38 and a retainer 37. The retainer 37 has a bore 39 and an extension 27 which registers through bore 65 of the slitter 32, radially positioning the slitter 32 on retainer 37. The end 40 of the shaft 36 fits into the bore 39 of the retainer 37, radially positioning the retainer 37 and the slitter 32 on the shaft 36. An assembly comprising the slitter 32 positioned on the retainer 37 is secured by three bolts 41 or other conventional means to the flange 38, an enlarged portion of the shaft 36. A collar 46 secured to the shaft 36 by a key or by other suitable conventional means, axially positions the shaft 36 relative to the journal box 85.

Rotation of the upper slitter 32 is effected through the shaft 36 driven by a motor 49 (see FIG. 1) bolted or otherwise secured to the upper face of table 96. The motor 49 causes rotation of an output shaft (not shown) connected to a speed reducer 50. Rotation output of the speed reducer 50 is transmitted through a shaft 63 to an output pulley 51 secured by conventional means to the shaft 63. Rotation of the pulley 51 rotates a pulley 47 through a belt 52 or other conventional drive means. The pulley 47 is secured to an end of shaft 36 by a mounting flange 48.

Suitably secured at one end 44 of lower slitter shaft 58 is the lower disc-like slitter 34 of slitting device 30 which has an outer periphery 68, a pair of flat surfaces 77, and a central bore 69. Each margin of the periphery 68 comprises a circular cutting edge 71 The wear resistance of the lower slitter 34 can be improved if each cutting edge 71 is composed of a hard material such as carbide. The slitter 34 is secured to the shaft 58 positioned between a flange 74 and a retainer 73. The retainer has a bore 75 and an extension which registers through bore 69 of the slitter 34 radially positioning the slitter 34 on retainer 73. The end of the shaft 158 fits into the bore 75 of the retainer 73, radially positioning the retainer 73 and the slitter 32 on the shaft 58. An assembly comprising the slitter 34 positioned on the retainer 73 is secured by three bolts 41 or other conventional means to the flange 74, an enlarged portion of the shaft 58.

The lower slitter 34 is positioned relative to upper slitter 32 such that the rotation of upper slitter 32 causes lower slitter 34 to rotate through frictional contact between adjacent faces 76 and 77 of the upper and lower slitters. As shown in FIG. 3, one flat annular face 76 of the upper slitter 32 contacts one flat surface 77 of the lower slitter 34. When upper slitter 32 rotates, for example, in direction indicated by arrow B, frictional contact between upper and lower slitter faces 76 and 77 will effect rotation of the lower slitter 34 in the direction indicated by arrow C.

Figure 4:
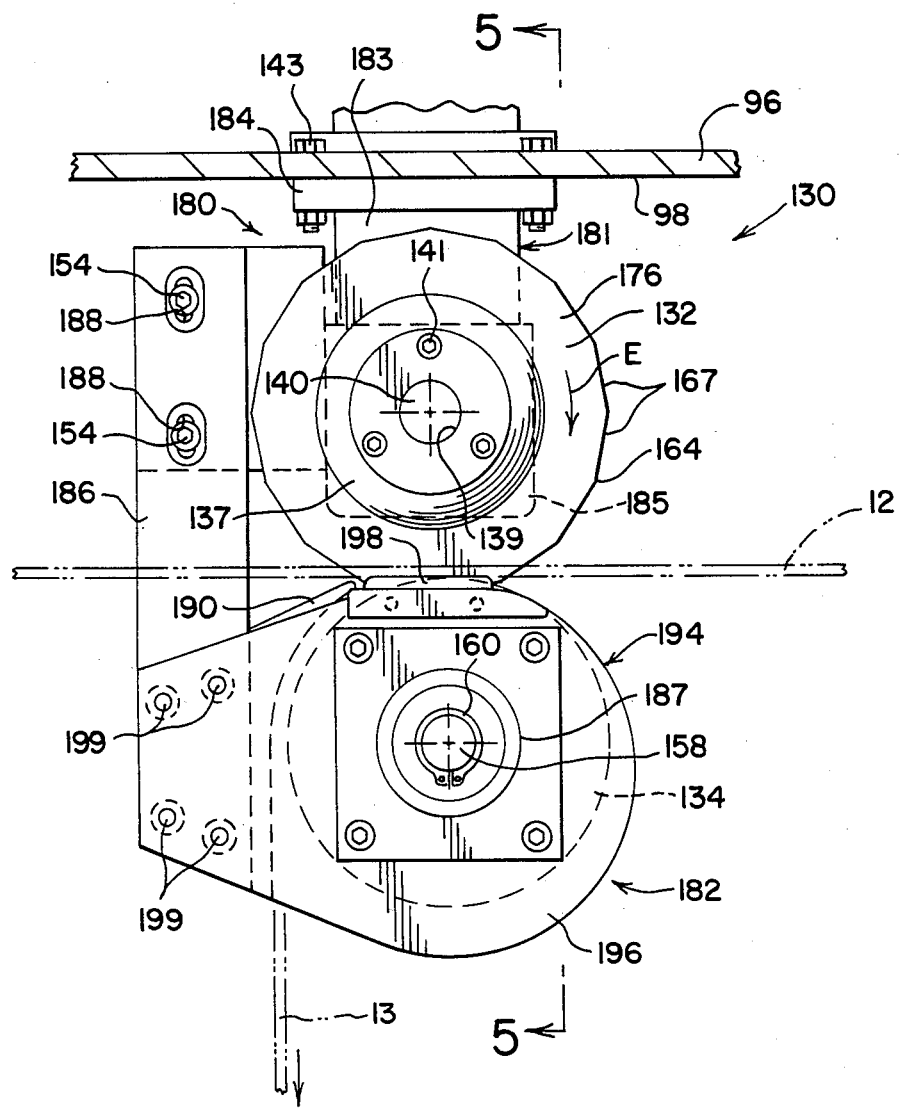
FIG. 4 is an enlarged end view taken along the line 4—4 in FIG. 1.
Figure 5:
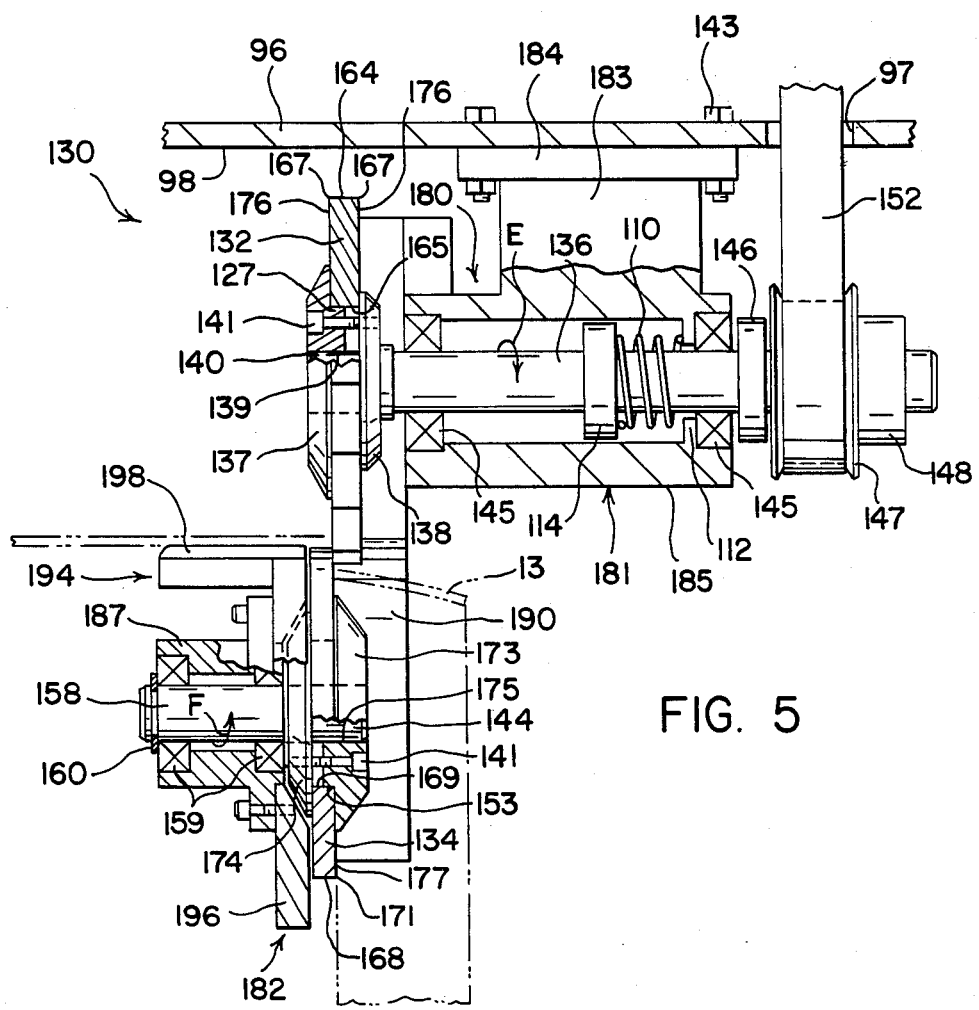
FIG. 5 is an enlarged longitudinal sectional view taken along the line 5—5 in FIG. 4.

The trimming device 130, as seen in FIGS. 1, 4 and 5, is similar in most respects to the slitter device 30 and the description will be abbreviated t demonstrate the principal similarities and differences between the two devices 30 and 130. Trimming device 130 comprises an upper trimmer drive 128, an upper disc-like trimmer 132 and a lower disc-like trimmer 134 rotatably mounted in and supported by a trimmer support 180. In a preferred embodiment of the invention, the upper trimmer 132 is mounted for rotation coaxially with the upper slitter 32 and the lower trimmer 134 is mounted for rotation coaxially with the lower slitter 34.

Trimmer support 180 includes an upper section 181 and a lower section 182. Upper section 181 includes an upper shaft journal box or housing 185 and a support arm 183 with a mounting flange 184 for securing trimmer support 180 to the bottom face 98 of the table 96 by bolts 143. Lower section 182 of trimmer support 180 includes a lower shaft journal box or housing 187, an extension plate 186, and a strip support plate assembly 194. Lower section 182 is secured to upper section 181 by bolts 154 registered through oversized openings 188 in extension plate 186. The support plate assembly 194 comprises a strip support plate 198 and a strip support plate housing 196 which is attached to the extension plate 186 by four bolts 199 or secured to plate 186 by other conventional means. The support plate 198 is attached to the housing by bolts (not shown) or can be attached by other conventional means. Additionally mounted on the lower section 182 is a trim scrap deflector 190 which deflects the cut boundary strip 13 from the trimming device 130.

Upper section journal housing 185 and lower section journal housing 187 are provided with bearings 145 and 159, respectively (see FIG. 5), to support rotating shafts within such housings. An upper trimmer shaft 136 is mounted for rotation in their journal housing 185 while a lower trimmer shaft 158 is mounted for rotation within journal housing 187.

Suitably secured at one end 140 of the trimmer shaft 136 is the upper disc-like trimmer 132 of trimming device 130, which has an outer periphery 164, a pair of flat surfaces 176, and a central bore 165, as shown in FIG. 5. Each margin of the periphery 164 comprises a series of sixteen linear cutting edges 167 of equal length defining a polygonal cutting edge. Wear resistance of the cutting edges 167 may be improved if each cutting edge 167 is composed of a hard material such as carbide. The trimmer 132 is secured to the shaft 136, positioned between a flange 138 and a retainer 137. The retainer 137 has a bore 139 and an extension 127 which registers through bore 165 of the trimmer 132, radially positioning the trimmer 132 on retainer 137. The end 140 of the shaft 136 fits into the bore 139 of the retainer 137, radially positioning the retainer 137 and the trimmer 132 on the shaft 136. An assembly comprising the trimmer 132 positioned on the retainer 137 is secured by three bolts 141 or other conventional means to the flange 138, an enlarged portion of the shaft 136 in a similar arrangement to that of securing the upper slitter 32 by the retainer 37 and the flange 38. A spring 110 located on the shaft 136 is pressed between a journal box lip 112 and a collar 114 which is threaded onto shaft 136 or secured to the shaft 136 by other conventional means to allow for axial adjustment of spring 110. The spring 110 biases the upper trimmer 132 leftwardly as viewed in FIG. 5, that is, towards the lower trimmer 134. A collar 146 secured to the shaft 136 by a key or by other suitable conventional means, axially positions the shaft 136 relative to the journal box 185.

Rotation of the upper trimmer 132 is effected through the shaft 136 driven by a motor 149. The motor 149 causes rotation of an output shaft (not shown) connected to a speed reducer 150. Rotation output of the speed reducer 150 is transmitted through a shaft 163 to an output pulley 151 secured by conventional means to the shaft 163. Rotation of the pulley 151 rotates a pulley 147 through a belt 152 or other conventional drive means. The pulley 147 is secured to an end of shaft 36 by a mounting flange 148.

Suitably secured at one end 144 of lower trimmer shaft 158 is the lower disc-like trimmer 134 which has an outer periphery 168, a pair of flat surfaces 177, and a central bore 169. Each margin of the periphery 168 comprises a circular cutting edge 171. As in the upper trimmer 132 the wear resistance of the lower trimmers 134 can be improved if each cutting edge 171 is composed of a hard material such as carbide. The trimmer 134 is secured to the shaft 158 positioned between a flange 174 and a retainer 173. The retainer 173 has a bore 175 and an extension 153 which registers through bore 169 of the trimmer 134, radially positioning the trimmer 134 on retainer 173. The end 144 of the shaft 158 fits into the bore 175 of the retainer 173, radially positioning the retainer 173 and the trimmer 132 on the shaft 158. An assembly comprising the trimmer 134 positioned on the retainer 173 is secured by three bolts 141 or other conventional means to the flange 174, an enlarged portion of shaft 158. A snap ring 160 secured to the shaft 158 by conventional means axially positions the shaft 158 relative to the journal box 187.

The lower trimmer 134 is positioned relative to the upper trimmer 136 such that the rotation of upper trimmer 132 causes lower retainer 134 to rotate through frictional contact between adjacent faces of the upper and lower trimmers. As shown in FIG. 5, one flat annular face 176 of the upper trimmer 132 contacts one flat surface 177 of the lower trimmer 134 similar to the arrangement in the slitting device 30. When the upper trimmer 132 rotates, for example, in a direction indicated by arrow E, frictional contact between upper and lower trimmer faces 166 and 167 will effect rotation of the lower trimmer 134 in the direction indicated by arrow F.

Longitudinally cutting a cord reinforced rubber sheet 12 on apparatus 10 begins by conveying sheet 12 to the slitting device 30 and trimming device 130. The sheet 12 often comprises steel reinforcing cords, although the reinforcing cords could be textile or glass. The slitting device 30 is positioned to longitudinally cut the sheet 12 into strips of stock of predetermined width.

The combination of a sixteen-sided linear edge on the periphery of the upper slitter 32 or trimmer 132 and the circular edge on the periphery of the slitter 34 or lower trimmer 134 can be replaced by other combinations. The slitting device may be composed of both the upper and lower slitters having linear edges; both the upper and lower slitter have circular cutting edges, or the upper slitter having a circular cutting edge and the lower slitter having the linear cutting edges. Identical combinations apply to the trimming device.

While there has been shown and described a preferred embodiment of the present invention, it will be understood by those skilled in the art that various rearrangements and modifications can be made therein without departing from the scope of the invention which is to be measured by the accompanying claims.

I claim:

1. An apparatus for longitudinally cutting cord reinforced rubber sheet into at least two strips of tire ply stock of predetermined width, said apparatus comprising a slitting device, said slitting device comprising: an upper disc-like slitter rotatable about a horizontal axis, said upper slitter having a plurality of linear cutting edges along its periphery; and a lower disc-like slitter rotatable about a horizontal axis, said lower slitter having a circular cutting edge along its periphery; means to rotate said upper slitter; said upper and lower slitters disposed such that upon rotation of said upper slitter (A) said plurality of linear cutting edges of said upper slitter cooperate in shear with said circular cutting edge of said lower slitter, and (B) portions of said upper slitter are in frictional contact with said lower slitter thereby effecting rotation of said lower slitter;

said apparatus further comprising: a trimming device for trimming a boundary strip of said sheet, said trimming device located adjacent said slitting device and comprising: an upper disc-like trimmer rotatable about a horizontal axis, said upper trimmer having a plurality of linear cutting edges along its periphery; and a lower disc-like trimmer rotatable about a horizontal axis, said lower trimmer having a circular cutting edge along its periphery; means to rotate said upper trimmer; said upper and lower trimmers disposed such that upon rotation of said upper trimmer (A) said plurality of linear cutting edges of said upper trimmer cooperates in shear with said circular cutting edge of said lower trimmer, and (B) portions of said upper trimmer are in frictional contact with said lower trimmer thereby effecting rotation of said lower trimmer; said trimming device further comprising a spring suitably mounted to bias said upper trimmer towards said lower trimmer and trim scrap deflector suitably mounted to deflect said boundary strip from said trimming device.

* * * * *